3,348,409
METHOD AND APPARATUS FOR ANALYZING GAS ABSORPTION AND EXPIRATION CHARACTERISTICS
Robert M. Arthur, 5500 Wabash Ave., Terre Haute, Ind. 47803
Filed Sept. 19, 1963, Ser. No. 310,025
9 Claims. (Cl. 73—19)

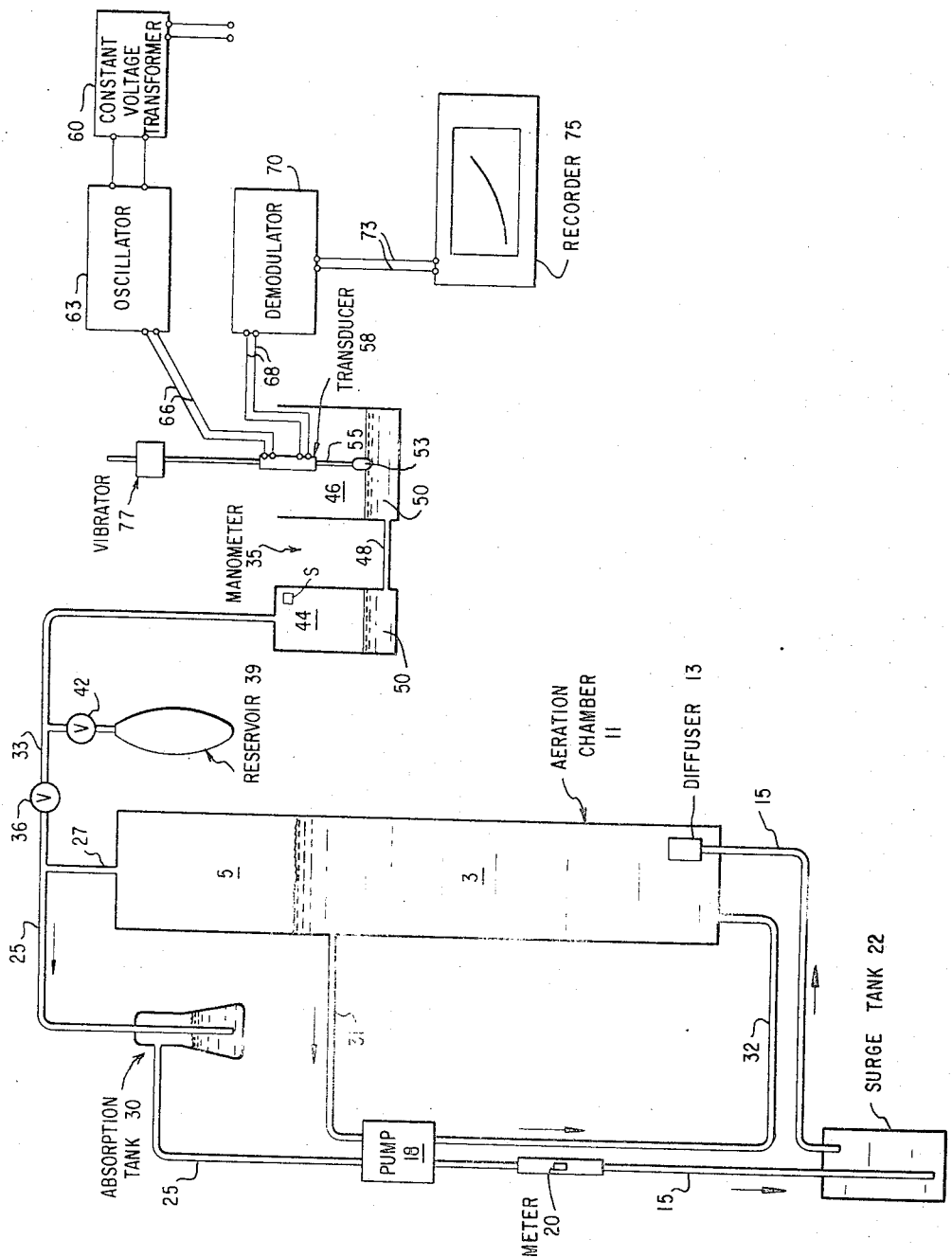

This invention relates to an apparatus and method for measuring the amount of gas absorbed or released by a substance. For instance, in biological work they are useful in studies to measure the oxygen utilization by bacteria cultures.

One such study makes use of stable isotope Oxygen-18 to trace the path and rate of oxygen utilization during active respiration and synthesis of the culture. A preliminary step in this study was to develop an experimental procedure which would produce cultures having reproducible oxygen demand rates. "Oxygen demand" is the amount of oxygen consumed or absorbed by a media containing a respiring culture. To determine if a culture has a reproducible oxygen demand rate, a large number, e.g. 50, of runs testing the oxygen demand of a given culture are required to aid in evaluating whether the oxygen demand of the culture is reproducible. To make such a large number of runs without the benefit of automatic recording involves tedious observations which are both time-consuming and expensive.

This invention is particularly concerned with an automatic recording apparatus and method for measuring the accumulated amount of oxygen absorbed by a liquid culture, e.g. of a bacteria microorganism suspension, which apparatus and method of course, can be adapted to other situations as well, for instance, to situations involving a liquid or solid substance which either absorbs or releases a gas when it is desired to determine the amount or rate of such gas absorption or expiration by the substance. The apparatus can be used for batch or continuous flow methods. In biological applications, however, the batch method can be advantageously employed to provide a continuous graphical record of oxygen utilization by a culture.

The apparatus is simple to use and inexpensive to construct and is sensitive to and highly accurate in measuring the gas absorption and expiration characteristics of a substance and in this connection has been found particularly useful in measuring oxygen utilization by bacteria cultures. Although the measurement is automatic, this invention affords a number of advantages other than its automatic recording features, for instance, it can operate at the same time that oxygen-18 tracer studies are being made and it does not interfere with the normal growth of the bacteria culture. In the aspect of simultaneously conducting oxygen-18 tracer studies, the apparatus can be provided with an aeration chamber large enough to contain a large amount of culture. This is often necessary so that small samples of culture can be removed for 0–18 analysis without seriously affecting the total amount of culture present. For example, the removal of six five-ml. samples from a total of 1000 ml. of culture suspension changes the total by only 0.51 percent.

Another advantage of the apparatus of the present invention resides in the provision of a closed system which avoids loss of 0–18 during the runs. Other more specific advantages will be set forth infra in connection with the description of the apparatus.

When utilized in connection with biological applications involving respiring cultures in aqueous suspensions, the apparatus of the present invention automatically records the rate of oxygen utilized, e.g. consumed by (i.e. the oxygen demand of) the respiring culture in respiration and can be characterized as a "recording respirometer." It measures oxygen demand by automatically recording changes in partial pressure of the oxygen in a closed system and records the change in partial pressure of the oxygen per unit time which record can be converted to volume or mass rate of change of oxygen, i.e. rate of oxygen demand. The amount of decrease in the total pressure of the system is proportional to the amount of oxygen consumed by the culture. Since the measurements may be affected by rate of solution as well as biological oxygen demand, the invention provides for oxygen availability faster than the rate of oxygen demand.

In the recording respirometer, the partial pressure is measured manometrically, and the change in pressure is converted to an electrical signal by the use of a sensitive transducer. The components of the apparatus include a gas circulation system which comprises a closed aeration chamber containing the culture or other substance to be tested, a line for collecting gas from above the culture and discharging the gas, preferably through a diffuser, at the bottom of the aeration chamber, a pressure recording system comprising a manometer which indicates the change, e.g. decrease, in partial pressure of the gas in the gas circulation system by changes in the height of the manometer fluid, a sensitive transducer which converts the change in height of the manometer fluid to an electrical signal and a continuous potentiometric recorder which converts the electrical signal from the transducer to a graph of gas consumption versus time. In this apparatus a linear differential transformer is preferentially used in the transducer. When used to measure oxygen utilization by a biological culture, other components of the apparatus may include an NaOH bubbler in the gas circulation line to absorb carbon dioxide, a reservoir to supply additional oxygen, an oscillator to supply the proper frequency to the linear differential transformer, a rectifier or demodulator to convert the A.C. signal from the linear differential transformer to D.C., a voltage regulator to supply stable line voltage, and a vibrator to assure steady displacement of the armature in the linear differential transformer.

The description of the apparatus and operation of the method of this invention will be more clearly understood by reference to the drawing which illustrates the apparatus but is not to be considered limiting.

There is shown a substance, e.g. bacteria culture, 3 in aeration chamber 11. As the culture in the aeration chamber utilizes gas, e.g. absorbs oxygen, the partial pressure of the oxygen in gas space 5 decreases, causing manometer fluid 50 in closed leg 44 of manometer 35 to rise, which rise in fluid forces additional gas into space 5 in an amount equal to the amount that was absorbed. This in turn causes the fluid 50 in open leg 46 of the manometer to fall, thereby changing, i.e. lowering, the position of float 53 and the armature of transducer 58, which preferably includes a linear differential transformer. As the armature is displaced, dissimilar voltages are impressed across two secondary windings in the transformer. The voltage change across the output of the transformer is calibrated to reflect the amount of oxygen utilized. The difference in the magnitude of the impressed secondary voltages is directly related to the displacement of the armature providing that the displacement is not larger than a prescribed amount for the particular transformer model. Outside this range the relationship between the impressed voltage and the displacement of the armature is not linear. The voltage difference is A.C. and is converted by demodulator 70 to D.C. before being fed into a recorder 75. The D.C. signal which is fed into the recorder is itself proportional to the displacement of the armature. The result is a record of change in oxygen partial pressure with time, i.e., an oxygen consumption curve.

The following description will provide a specific embodiment of the present invention. In the drawing, aeration chamber 11, suitable for holding bacterial culture 3 in liquid suspension or other oxygen absorbing substance, is provided with a closed, air-tight gas circulation means comprising a gas diffuser 13, in a gas circulation relationship with gas space 5 of chamber 11.

The apparatus employed as an aeration chamber can be a glass column, 120 cm. in height, 3.5 cm. in diameter and having a working volume of 1.2 liters. Any size aeration chamber, however, can be used thus advantageously providing for the use of varied amounts and kinds of substances which can be tested for their gas absorption and expiration characteristics. The diffuser at the bottom may be stone for fine bubble aeration or an inverted gooch crucible to provide large bubble aeration. Diffuser 13 is attached to the exit end of a gas conduit 15 which in turn is connected to air-tight pump 18 by way of surge tank 22, conduit 15 and meter 20. Between the pump 18, which preferably is a finger pump, and diffuser 13, may be installed a meter 20, preferably a rotameter, and/or the surge tank 22.

The pump can be a finger pump built by Sigmamotor, Model No. T6. Tygon tubing can be used to prevent absorption of oxygen. The method of operation of this pump assures contamination-free gas recycling. The air flow rate, generally ranging from about 5 cc./min. to 1000 cc./min., can be conveniently changed by changing the motor speed or the size of the tubing. The rate of gas flow can be advantageously maintained at a high rate to insure an ample supply of gas for adsorption by substance 3.

The inlet end of the pump 18 is connected to gas space 5 of aeration chamber 11, preferably at its top, by lines 25 and 27. Line 25 may include absorption tank 30 which may be provided with a contaminant-absorbing substance, such as NaOH for removal of carbon dioxide from the gas, e.g. air or oxygen-enriched air, being recycled from space 5 to the bottom of aeration chamber 11, and up and through culture 3. This particular absorption tank contains 100 ml. of 10% NaOH solution. A separate chamber of the pump 18 may be provided for continuous recycle of the liquid culture by lines 31 and 32 to prevent sedimentation or stratification, particularly when a batch system is used.

The conduit 27 is also attached to gas pressure transmission line 33 which leads to closed leg 44 of the manometer, indicated generally by the number 35. Line 33 may be provided with valve 36. Also, gas reservoir 39 may be provided along line 33 although this reservoir may be provided instead along lines 15, 25 or 27 for the purpose of injecting pure gas, e.g. oxygen, into the system. The reservoir 39 is generally provided with the valve 42. The reservoir can be a cylinder containing oxygen under pressure or it can be a collapsible bag containing oxygen which when compressed will release oxygen.

Manometer 35 generally may be composed of closed, air-tight chamber 44 and open-to-the-atmosphere chamber 46 connected near the bottom of the chambers by the line 48 in a fluid, e.g. liquid, communication relationship. Any convenient pressure transmitting or manometer fluid, e.g. oil 50, is placed as the manometer liquid in the bottoms of chambers 44 and 46 and liquid connection line 48.

Manometer closed chamber 44 can be a 500 ml. suction flask, 10 cm. in diameter, inverted with its mouth in the oil to prevent leakage of gas. Open manometer chamber 46 is, in this instance, approximately 30 cm. in diameter. The manometer fluid is, in this instance, oil having a specific gravity of 0.85. The total pressure change in the system can be kept low and the amount of pressure change is dependent on the relative size of chambers 44 and 46. Open chamber 46 is provided with means, such as the float 53 for causing a linear motion in the rod 55 in response to changes in pressure in the line 33.

Rod 55 is attached to the armature of transducer 58, which includes a linear differential transformer. The transformer is advantageously the "Atcotran" by Automatic Timing and Controls, Inc. A particular type which can be advantageously used is No. 6208–M. This unit has a range of ±.15 in. Maximum movement in this application is 0.06 in. so it is well within the range of linearity.

The linear differential transformer is supplied with power to its primary winding from any convenient A.C. source. To insure constant conditions in the primary winding, the power is sent through the constant voltage transformer 60 and the oscillator 63 which assures a constant current cycle. A Hewlitt-Packard oscillator having a frequency variable from 20 to 20,000 c.p.s. can be advantageously used. Its amplitude is variable. A frequency of 1000 c.p.s. is advantageously used.

Electrical power is conducted from oscillator 63 by lines 66 to the primary coil of linear differential transformer 58. This transformer is so arranged that the voltage difference between its secondary coils will vary depending on the position of the armature.

Power is conducted from the secondary coils by the leads 68 to the demodulator 70, a simple diode demodulator, where the electricity is converted into direct current. This direct current power is fed by leads 73 to the recorder 75, which converts voltage changes into, preferably, a written record. A Brown recorder, manufactured by Minneapolis Honeywell, Model No. 153C10PS–21–20F2A4 can be used. This unit has a full range of 10 mv. and a 30 second pen speed. Chart speed is four inches per hour.

The upper end of the armature of transformer 58 is preferably attached to vibrator 77 to overcome the effects of friction on movement of the armature. The vibrator can consist of a ¼ horsepower motor set on a shelf to which the transformer was also connected. The rotation of the motor causes just enough vibration to overcome the friction of the transformer armature.

The above sequence of operation of the apparatus continues until the absorption of oxygen by the culture stops or until the oxygen in chamber 44 of the manometer is depleted. If the latter occurs, float switch S, in an actuation relationship (not shown) with valves 36 and 42, automatically closes valve 36 and opens valve 42 to allow for a release of oxygen, under pressure, from reservoir 39 to provide oxygen into the system and into chamber 44 to lower the level of fluid 50 in chamber 44 to a point where float switch S automatically closes valve 42 and opens valve 36. This can be conducted in association with the recorder. For instance, full-scale on the recorder can equal 100 ml. When the total consumption of oxygen equals 100 ml., valve 36 may be closed and valve 42 opened. Oxygen is forced into the line 33 from the reservoir 39, causing the level in the closed chamber 44 to fall and the level in the open chamber 46 to rise, moving the recorder pen back to zero. This can be accomplished automatically by an electrical association between the recorder, manometer, reservoir and valves as described above or it can be done manually.

The apparatus is easily calibrated by adjusting the voltage applied to the primary winding of the transformer. In practice the instrument is first zeroed by either adjusting the null control on the rectifier circuit, adjusting the liquid level of the manometer tank, or by adjusting the vertical position of the transformer. A known volume of manometer fluid is then withdrawn from the open manometer tank. The recorder will then indicate a reading which may or may not be similar to the amount of fluid withdrawn. If the recorded amount is equal to the amount withdrawn then calibration is complete. If not, an adjustment of the input voltage will either increase or decrease the recorded value. It is then necessary to repeat the zeroing and the calibration since voltage adjustments affect the position of the null. In any event it is usually desirable to check both the full and half range of the instrument.

The range of the instrument is easily changed by any factor, either by changing the input voltage by the inverse of that factor, or by changing the cross-sectional area of the open leg of the manometer by the same factor. The first method is faster but may be limited by the range of linearity of the particular transformer used. The second method is preferred because the range of movement of the transformer is not altered.

To prove the accuracy obtainable in the apparatus of the invention, several runs were made using sodium sulfite. The addition of this chemical to water results in an almost immediate depletion of oxygen dissolved in the water and a demand for additional oxygen in stoichiometric relation to the amount of sulfite added. The demand for oxygen will continue at a rapid rate until all of the sulfite has been converted to sulfate. At this point there is a very definite break in the rate of oxygen utilization. In these tests, a measured amount of sulfite was added to the aeration column and the amount of oxygen consumed recorded. The theoretical volume, V, of oxygen at 760 mm. and 0 degrees C. consumed by one gram of sodium sulfite is given below:

$$SO_3^= + \tfrac{1}{2}O_2 = SO_4^=$$

$$\frac{1}{126.048} = \frac{x}{16}$$

$$x = \frac{16}{126.048} = .127 \text{ grams} = 127 \text{ mg.}$$

At standard conditions. (760 mm. and 0° C.)

The specific weight of oxygen is 1.429 mg./ml. Then V=89 ml.

One of the factors affecting the final result provided by the apparatus of the present invention resides in the almost immediate demand for gas, e.g. oxygen, by a gas-absorbing substance, e.g. a bacteria culture, which occurs after the culture is placed in chamber 11 and before the apparatus is closed to the atmosphere. To provide more accurate and precise results, the method of introducing the substance to the apparatus was found to be important.

In one advantageous method, method A, using sodium sulfite instead of a culture for illustration purposes, the manometer flask is filled with oxygen from the oxygen reservoir and the line to the manometer is closed. The aeration chamber is filled with tap water which is deaerated by purging with an inert deaerating gas, e.g. nitrogen, for a period of time sufficient to deaerate the water, e.g. a period of about ten minutes. After partial purging, e.g. for about five minutes, a portion, e.g. 10 ml. sample, of deaerated water is withdrawn from the aeration column to be mixed with the sulfite and cobalt catalyst. After the ten minute purging period the solution of sulfite is added to the column while still flushing with nitrogen. The nitrogen line is closed and the air recycling pump is started. When the system is stable as indicated by a constant level of water in the column, the system is closed to the atmosphere and the line to the manometer opened. The test is continued until a definite break occurs in the uptake curve when the pump is turned off and a sample, for instance a 300 ml. sample, is removed from the column for D.O analysis. Subtracting the final D.O. from the total recorded gives the total consumption of oxygen at the temperature of the run. This is converted to standard temperature and pressure.

In another advantageous method, method B, the manometer flask is first filled with gas to be absorbed, e.g. oxygen, from the reservoir and the line to the manometer closed. A separate container is filled with ten liters of tap water and purged with a deaerating gas, e.g. nitrogen, for a period sufficient to dearate the water, e.g. of about ten minutes. After the ten-minute purging, a sample of deaerated water is forced out of the container using the pressure of the nitrogen. To this water is added a weighed sample of sulfite and cobalt catalyst, usually enough for ten one-liter sample runs. The solution of sulfite is carefully returned to the large container to prevent introduction of oxygen. The container is purged again for several minutes and then a one-liter sample of the solution is forced into the aeration chamber of the apparatus using the pressure of the nitrogen, while nitrogen is still being used to purge the solution. The entire gas system of the apparatus is then closed to the atmosphere, the pump started and the oxygen reservoir line opened. The test is continued until a definite break occurs in the uptake curve. The pump is turned off and a sufficient e.g., 300 ml., sample removed to determine the oxygen demand. Subtracting the final demand from the total recorded gives the total consumption of oxygen at the temperature of the run. This can be converted to standard conditions.

The results of runs using methods A and B and sodium sulfite are set forth in the table below.

TABLE OF RESULTS

| Method Used | No. of Runs | Sulfite, grams | Theoretical Demand, ml. | Actual Mean Demand S.T.P., ml. | σ, ml. | Percent Error |
|---|---|---|---|---|---|---|
| X* | 104 | 1 | 89 | 83.0 | 7.29 | 6.8 |
| A | 17 | 1 | 89 | 88.4 | 4.24 | 0.68 |
| B | 9 | 1 | 89 | 81.4 | 2.12 | 8.5 |

*A variety of methods including A and B.

The tabulated results indicate the following about the accuracy and precision of the apparatus in recording total oxygen consumption:

(1) The results from analyzing all of the runs indicate that the instrument is accurate to within 7% and that 80% of the recorded values should fall within a range of 9.5 ml. from the mean value. Also, only one of the deviations of the recorded values was greater than 3σ. Its deviation was 4σ and therefore could probably have been rejected as a doubtful value;

(2) The results of the runs from method A indicated that this procedure gave very accurate results (0.68%) and that the results were more precise (σ=4.24) than the results from analyzing all of the runs; and (3) The results of the runs from method B had the highest precision (σ=2.12).

It is obvious from the analysis of the results that it is possible to obtain precise readings or accurate readings using the apparatus of the present invention and that methods A and B for introducing the substance into the apparatus are particularly advantageous in this connection. It is also noted that method A gains more in accuracy than it loses in precision.

The results of the sulfite tests show that the recording respirometer will satisfactorily indicate total oxygen demand. The apparatus has been used to automatically record the oxygen demand of pseudomonas, aerobacter and mixed bacterial cultures. The apparatus is accurate, simple to operate, stable over long periods of time, easy to recalibrate when necessary, and requires no attention during operation. For these reasons, it is superior to other present means for measuring gas, e.g. oxygen demand.

The apparatus can also be advantageously used in a continuous system, for instance, by operatively associating chamber 11 in connection with a supply source for substance 3. The apparatus can also be advantageously utilized in automatically controlling processes involving as a factor the gas absorption or gas expiration characteristics of a substance.

It is claimed:
1. Apparatus for analysis of the gas absorption and gas expiration characteristics of a substance comprising a fluid-tight chamber containing a lower space for holding the substance and an upper gas space for providing the gas in contact with the substance, said chamber being operatively associated with a gas circulation system including a gas line interconnecting the upper gas space and the lower space and means for conducting said gas from the gas space into the lower space; a manometer containing a first, fluid-tight, closed-leg uncommunicative with the atmosphere, a second leg, and a manometric liquid in liquid communication with each leg, partially filling each leg, and defining a gas space in the first leg; gas-tight communication means in gas to gas communication between the gas space of the chamber and the gas space in the first leg of the manometer and adapted to reflect changes in the partial pressure of the gas in the chamber by a change in height of the manometric liquid in the second leg; means for converting the change in height of the manometric liquid into an electrical signal representative of the change and means for recording the electrical signal to thereby provide an indication of the gas absorption and expiration characteristics of the substance.

2. The apparatus of claim 1 wherein the gas circulation system contains absorption means adapted to absorb gas contaminants in the gas from the upper space.

3. Apparatus for analysis of the gas absorption and gas expiration characteristics of a substance comprising a fluid-tight chamber containing a lower space for holding the substance and an upper gas space for providing the gas in contact with the substance, said chamber being operatively associated with a gas circulation system including a gas line interconnecting the upper gas space and the lower space, pump means for conducting said gas from the gas space into the lower space, and a closed circulation system for circulating said substance through said chamber, said pump means being arranged to provide motive force in the circulation system for said substance; a manometer containing a first, fluid-tight, closed leg uncommunicative with the atmosphere, a second leg, and a manometric liquid in liquid communication with each leg, partially filling each leg, and defining a gas space in the first leg; gas-tight communication means in gas to gas communication between the gas space of the chamber and the gas space in the first leg of the manometer and adapted to reflect changes in the partial pressure of the gas in the chamber by a change in height of the manometric liquid in the second leg and electrical detection means for detecting changes in the height of the manometric liquid in the second leg to indicate the gas absorption and expiration characteristics of the substance.

4. The apparatus of claim 3 wherein the detection means includes a float reciprocatingly mounted in contact with the surface of the manometric liquid in the second leg which is in communication with the atmosphere; an armature of a linear differential transformer operatively connected to the float for converting the change in liquid height to an electric signal; and recording means responsive to changes in the signal.

5. The apparatus of claim 4 wherein a vibrator is in a vibrating relationship with the armature to overcome the effects of friction.

6. A method for analyzing the oxygen absorption characteristics of an aqueous bacterial culture in a system containing a fluid-tight chamber, a manometer containing a first, fluid-tight, closed leg uncommunicative with the atmosphere, a second leg, a manometric liquid in liquid communication with each leg partially filling each leg and defining a gas space in the first leg, and gas-tight communication means in gas to gas communication between the gas space of the chamber and the first leg of the manometer, which comprises charging the gas space in the closed leg of the manometer with oxygen, introducing water into the chamber, conducting a deaerating gas through the water to deaerate the water, removing a part of the water from the chamber, mixing the removed part of the water with the bacterial culture to form a solution of the bacteria culture, substantially completing the deaeration of the water in the chamber, introducing the solution of bacteria culture into the water in the chamber, and when the system is stable as indicated by a constant level of water in the chamber, closing the system to the atmosphere, and placing the oxygen in the closed leg in gas communication with the gas space of the chamber, circulating the oxygen from the top of the chamber to beneath the level of the water solution of bacteria culture in the chamber, reflecting changes in the partial pressure of the oxygen by a change in height of manometric liquid in the manometer, and detecting and indicating changes in the height of said manometric liquid as a measure of the oxygen absorption characteristics of the culture.

7. A method for analyzing the oxygen absorption characteristics of an aqueous bacteria culture in a system containing a fluid-tight chamber, a manometer containing a first, fluid-tight, closed leg uncommunicative with the atmosphere, a second leg, a manometric liquid in liquid communication with each leg partially filling each leg and defining a gas space in the first leg, and gas-tight communication means in gas to gas communication between the gas space of the chamber and the first leg of the manometer, which comprises charging the gas space in the closed leg of the manometer with oxygen, introducing a water solution of the bacteria culture into the chamber, and when the system is stable as indicated by a constant level of water in the chamber, closing the system to the atmosphere and placing the oxygen in the closed leg in gas communication with the gas space of the chamber, circulating the oxygen from the top of the chamber to beneath the level of the water solution of the bacteria culture in the chamber, reflecting changes in the partial pressure of the oxygen by a change in height of manometric liquid in the second leg of the manometer, and detecting and indicating changes in the height of said liquid as a measure of the oxygen absorption characteristics of the culture.

8. The method of claim 7 further including circulating the water solution of bacteria culture through said chamber.

9. The method of claim 7 wherein the manometric liquid is oil.

References Cited

UNITED STATES PATENTS

| | | | |
|---|---|---|---|
| 2,310,435 | 2/1943 | Jenkins | 73—23 |
| 2,348,177 | 5/1944 | Keeler | 73—398 |
| 2,861,450 | 11/1958 | Ransley | 73—19 |
| 2,903,678 | 9/1959 | Wills | 73—313 |
| 2,939,072 | 5/1960 | Bell | 73—313 |
| 2,987,912 | 6/1961 | Jacobson | 73—19 |
| 3,043,144 | 7/1962 | Glassey | 73—401 |
| 3,057,199 | 10/1962 | Koehne | 73—321 |

FOREIGN PATENTS 833,926   5/1950   Great Britain.

OTHER REFERENCES

Book—Manometric Techniques by Umbreit, Burris & Stauffer, Burgess Publishing Co., Minneapolis, pages 1–3, 9–15, copy in P. O. library QP 88 U5.

RICHARD C. QUEISSER, *Primary Examiner.*

C. IRVIN McCLELLAND, *Assistant Examiner.*